Nov. 14, 1967

C. A. PETERSON 3,353,093

TRANSFORMER AND SATURABLE REACTOR VOLTAGE REGULATOR

Filed June 24, 1963

INVENTOR.
CARL A. PETERSON
BY
Robertson & Smythe
ATTORNEYS

United States Patent Office

3,353,093
Patented Nov. 14, 1967

3,353,093
TRANSFORMER AND SATURABLE REACTOR VOLTAGE REGULATOR
Carl A. Peterson, Oak Park, Ill., assignor to Basic Products Corporation, Elk Grove Village, Ill., a corporation of Wisconsin
Filed June 24, 1963, Ser. No. 289,886
11 Claims. (Cl. 323—43.5)

This invention relates to power modulators and particularly to a system and modulator for use as a line voltage or constant current regulator.

One of the problems found in prior art devices for regulating voltage or current has been that they are relatively expensive and that they have not been sufficiently fast in response for satisfactory operation. Some of the prior devices undesirably have moving parts instead of being of the static type.

One of the objects of this invention is to provide a power modulator which can be built from standard magnetic components.

Another object of the invention is to provide a power modulator which will be fast and which will provide the desired waveform.

Another object of the invention is to provide an arrangement which can use semi-conductor control means so as to reduce size and weight of the unit, and so as to increase the speed of response.

In one aspect of the invention, the core has a main winding means which can be a single winding in an autotransformer configuration or can be a pair of windings isolating the main winding from the power input winding. Thus, the A.C. source or input is connected directly to the main winding. First and second auxiliary windings are on the core and are connected in series opposed polarity relation to each other and in series with the main winding. Normally, the first winding has one terminal connected to the main winding so as to be in voltage boosting relation, the second auxiliary winding then being in bucking relation. The load has one terminal or portion connected to one end or portion of the main winding, secondary winding or to the winding itself. The other terminal is arranged so that it is connected through an impedance, such as a reactor, to the outer end or portion of the second auxiliary winding and also through an impedance, such as a reactor, to a point between the first and second auxiliary windings. One of the impedances is made variable. The relatively fixed impedance may be linear but can have other characteristics. The variable impedance can be a saturable reactor having D.C. control windings. It also can take other forms such as self-saturating magnetic amplifier means, silicon controlled rectifier means, or other suitably controlled circuits. The variable impedance can be controlled by a suitable load sensing means, then compared and amplified to control the impedance. When the term "terminal" or "end" is used, it means the portion of the winding so related but is not necessarily the extreme end.

Other objects, advantages and features of the invention will become apparent from the following description and drawings which are merely exemplary.

Figures 1, 2:
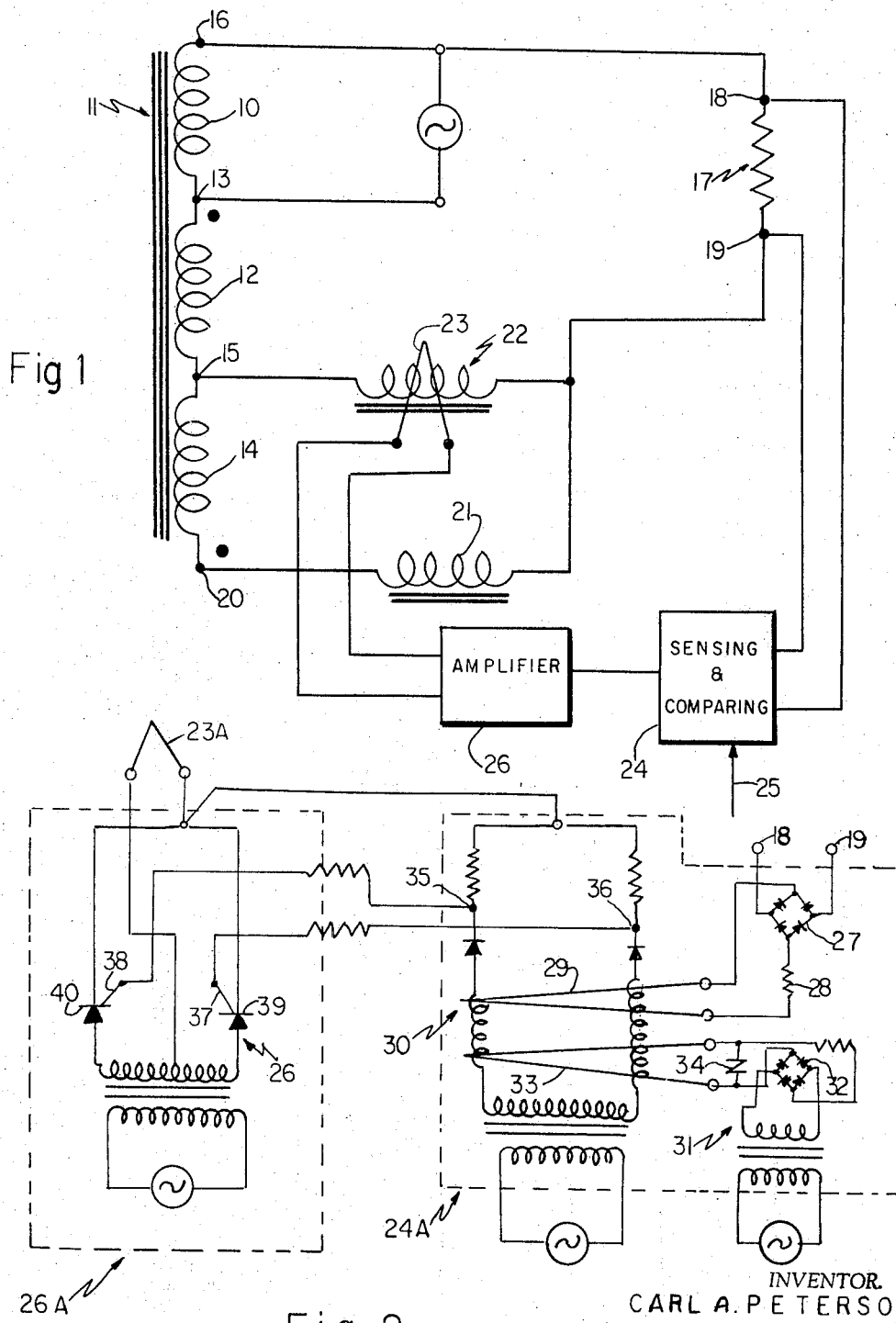
FIG. 1 is a circuit diagram showing one form of the invention, some portions thereof being in block form.
FIG. 2 is a circuit diagram showing one form of sensing and control circuit which can be used.
Figure 3:
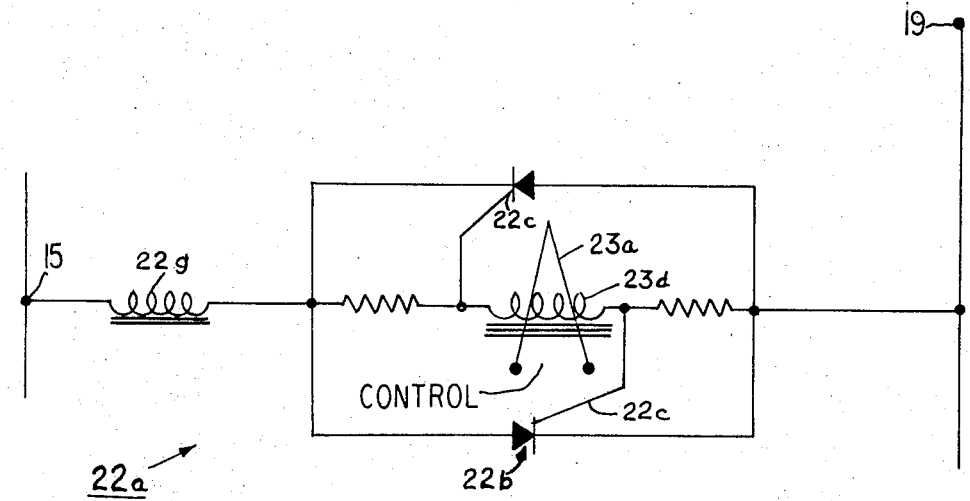

FIG. 3 is a fragmentary circuit diagram showing the use of an SCR circuit in place of the variable saturable reactor between points 15 and 19 of FIGS. 1 and 2.

Figure 4:
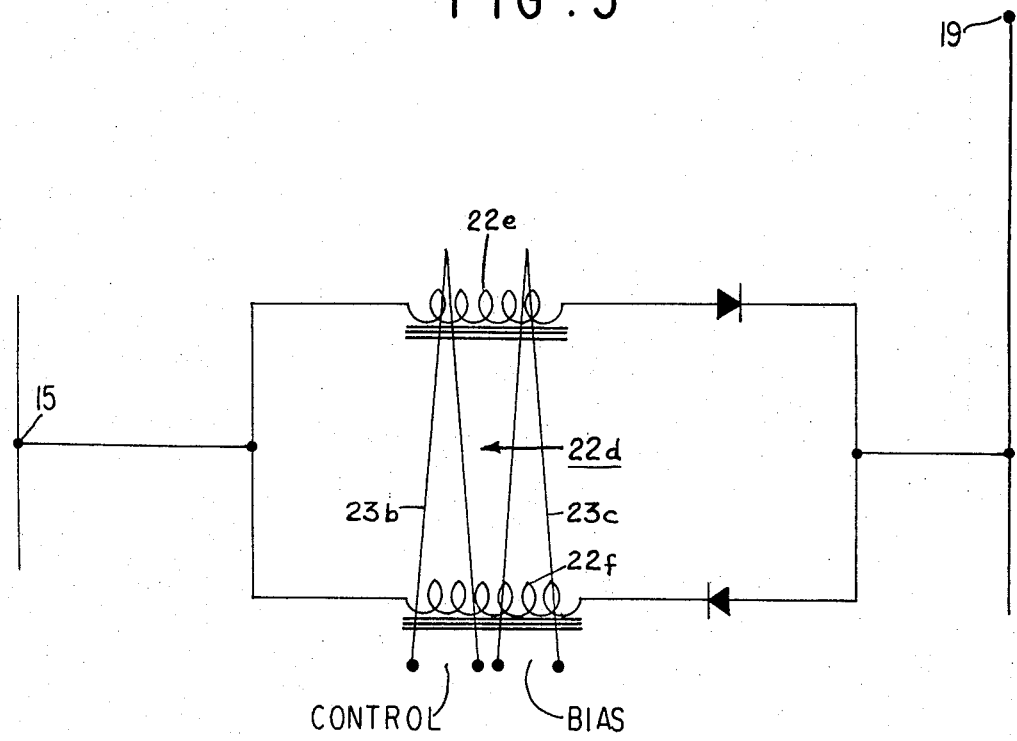

FIG. 4 is a fragmentary circuit diagram showing the use of a self-saturating magnetic amplifier arrangement between points 15 and 19 in place of the variable saturable reactor of FIGS. 1 and 2.

Referring to FIG. 1, main winding 10 is wound on the magnetic core 11 in a conventional manner. First auxiliary winding 12 has one end thereof connected to main winding 10 at point 13 and second auxiliary winding 14 has one end connected to the first auxiliary winding 12 at point 15. The input can be connected across main winding 10 between terminals 13 and 16. It is to be understood that the input also could be connected by means of a separate primary winding mounted on the core (not shown), or through an autotransformer connection (not shown) to the main winding 10. The first auxiliary winding 12 and second auxiliary winding 14 are connected to each other so as to be in opposed polarity relation as indicated in the drawing. Preferably, the first auxiliary winding 12 should be connected so as to have the same polarity relation as main winding 10. Thus, auxiliary winding 12 is in boost relation to winding 10 and winding 14 is in bucking relation.

Load 17 has one portion or terminal 18 connected to the main winding at terminal 16 and the other portion or terminal 19 connected to the outer end portion or terminal 20 of the second auxiliary winding 14 through impedance 21. In the arrangement shown, impedance 21 is a linear reactor. An impedance 22 also is connected to load terminal 19 and to a point between the auxiliary windings at terminal 15. Impedance 22 may take various forms. For example, in the form shown in FIG. 1, it may be a saturable reactor having D.C. winding means 23 associated therewith for controlling the same. Thus, saturable reactor 22 is a variable impedance, said impedance being controlled by the D.C. winding means 23 which can be controlled as desired.

As an example, a sensing and comparing device 24, shown in block form in FIG. 1, is connected so as to be responsive to the load voltage or current, the sensing and comparing device being fed with a suitable reference voltage 25. The error signal produced by the sensing and comparing device 24 is fed to amplifier 26 of a suitable type which is arranged to furnish D.C. control current to the D.C. control windings 23 of the saturable reactor 22.

The sensing and comparing means may take various forms such as a differential transistor amplifier in which the reference voltage is established by a Zener diode, the output of the differential amplifier then becoming the error signal for the amplifier. The sensing and comparing means also could be a magnetic amplifier having two control windings where one winding is supplied from a rectified feedback signal from the load, and the other winding is supplied from a reference voltage source. In a still further form, the amplifier could be a silicon controlled rectifier amplifier or a magnetic amplifier responsive to the error signal.

Merely by way of example, a sensing and comparing means and amplifier that can be used is shown in FIG. 2 wherein the amplifier is generally shown at 26A and the sensing and comparing means shown at 24A. The feedback for the amplifier is obtained from terminals 18, 19 (FIG. 1), such being fed into rectifier bridge 27, through resistor 28 to control windings 29 on magnetic amplifier 30. The reference voltage is furnished by transformer 31 and rectifier bridge 32 to the control windings 33 from Zener diode 34. The output of the magnetic amplifier is fed from terminals 35, 36 as pulses which are applied to the gate terminals 37, 38 of silicon controlled rectifiers 39, 40, respectively. The control winding 23A of the impedance (corresponding to winding 23 of FIG. 1) then is fed from the amplifier circuit 26A so as to control the impedance 22 (FIG. 1) in accordance with the load.

The variable impedance may take various well known forms in addition to that illustrated. For example, it may be a conventional self saturating magnetic amplifier means or a silicon controlled rectifier means. FIG. 3 illustrates a conventional SCR circuit which may be substituted between the points 15 and 19 of FIG. 1. FIG. 4 shows a common type of self saturating magnetic amplifier which may likewise be substituted between the points 15 and 19 of FIG. 1. The bias for the magnetic amplifier may be provided by any desired means well known in the art. In FIG. 3, for example, the variable impedance 22 of FIG. 1 may comprise an inductance 22g connected between the terminals 15 and 19 by silicon controlled rectifiers 22b having their gates 22c controlled by the control winding 23a and load winding 23d of a saturable reactor or the like. In FIG. 4, the self-saturating magnetic amplifier 22d comprises the load windings 22e and 22f controlled by the winding 23b and biased by the winding 23c. In the several figures, the primary reference numeral 22 relates in general to the variable impedance and the primary numeral 23 to the control element.

It should be apparent that details of the circuit can be changed without departing from the spirit of the invention except as defined in the appended claims.

What is claimed is:

1. In a regulator for supplying energy to load means, the combination including core means, main winding means on said core means, means feeding A.C. to said main winding means, first and second auxiliary winding means on said core means, said first and second winding means being connected in series with each other and said first auxiliary winding means being connected to said main winding means, said first and second auxiliary winding means being connected in opposed relation to each other, means connecting one part of said load means to a terminal means of said main winding means, a first and second impedance means, one of said impedance means being variable, and means connecting another part of said load means to said second auxiliary winding means through said first impedance means and also connecting said another part of said load means to a point between said first and second auxiliary winding means through said second impedance means.

2. In a regulator for supplying energy to load means, the combination including core means, main winding means on said core means, means feeding A.C. to said main winding means, first and second auxiliary winding means on said core means, said first and second winding means being connected in series with each other and said first auxiliary winding means being connected to said main winding means, said first and second auxiliary winding means being connected in opposed relation to each other, means connecting one part of said load means to a terminal means of said main winding means, a first and second impedance means, one of said impedance means being a saturable reactor means, and means connecting another part of said load means to said second auxiliary winding means through said first impedance means and also connecting said another part of said load means to a point between said first and second auxiliary winding means through said second impedance means.

3. In a regulator for supplying energy to load means, the combination including core means, main winding means on said core means, means feeding A.C. to said main winding means, first and second auxiliary winding means on said core means, said first and second winding means being connected in series with each other and said first auxiliary winding means being connected to said main winding means, said first and second auxiliary winding means being connected in opposed relation to each other, means connecting one part of said load means to a terminal means of said main winding means, a first and second impedance means, one of said impedance means being self saturating magnetic amplifier means, and means connecting another part of said load means to said second auxiliary winding means through said first impedance means and also connecting said another part of said load means to a point between said first and second auxiliary winding means through said second impedance means.

4. In a regulator for supplying energy to load means, the combination including core means, main winding means on said core means, means feeding A.C. to said main winding means, first and second auxiliary winding means on said core means, said first and second winding means being connected in series with each other and said first auxiliary winding means being connected to said main winding means, said first and second auxiliary winding means being connected in opposed relation to each other, means connecting one part of said load means to a terminal means of said main winding means, a first and second impedance means, one of said impedance means being silicon controlled rectifier means, and means connecting another part of said load means to said second auxiliary winding means through said first impedance means and also connecting said another part of said load means to a point between said first and second auxiliary winding means through said second impedance means.

5. In a regulator for supplying energy to load means, the combination including core means, main winding means on said core means, means feeding A.C. to said main winding means, first and second auxiliary winding means on said core means, said first and second winding means being connected in series with each other and said first auxiliary winding means being connected to said main winding means, said first and second auxiliary winding means being connected in opposed relation to each other, means connecting one part of said load means to a terminal means of said main winding means, a first and second impedance means, one of said impedance means being variable and the other being linear, and means connecting another part of said load means to said second auxiliary winding means through said first impedance means and also connecting said another part of said load means to a point between said first and second auxiliary winding means through said second impedance means.

6. In a regulator for supplying energy to load means, the combination including core means, main winding means on said core means, said main winding means being the primary portion of an auto-transformer, means feeding A.C. to said main winding means, first and second auxiliary winding means on said core means, said first and second winding means being connected in series with each other and said first auxiliary winding means being connected to said main winding means, said first and second auxiliary winding means being connected in opposed relation to each other, means connecting one part of said load means to a terminal means of said main winding means, a first and second impedance means, one of said impedance means being variable, and means connecting another part of said load means to said second auxiliary winding means through said first impedance means and also connecting said another part of said load means to a point between said first and second auxiliary winding means through said second impedance means.

7. In a regulator for supplying energy to a load means, the combination including core means, winding means on said core means, said winding means comprising a main winding portion and at least two other winding portions providing auxiliary windings, means for connecting A.C. to said winding means, an inductive potential divider comprising at least a pair of impedances connected in parallel relation and carrying load current in accordance with the impedance ratio therebetween, at least one of which is variable, said potential divider having input terminals connected at spaced points across one of said auxiliary windings, and load means connected to a point between any two of said impedances and to said winding means so that variations in impedance of at least one of said variable impedances will change the impedance ratio therebetween and thereby the effect of the winding means connected between said spaced points.

8. A regulator in accordance with claim 7 wherein said impedances are saturable reactors.

9. A regulator in accordance with claim 8 wherein one of said saturable reactors has control winding means, and control means responsive to the load level for controlling said control winding.

10. A regulator in accordance with claim 7 wherein the main winding means is an auto-transformer.

11. A regulator in accordance with claim 7 wherein said auxiliary windings are wound on said core means in opposed boost-buck relationship.

References Cited

UNITED STATES PATENTS

| | | | |
|---|---|---|---|
| 1,337,875 | 4/1920 | Alexanderson | 323—43.5 |
| 1,691,022 | 11/1928 | Crouse et al. | 323—89 X |
| 1,896,995 | 2/1933 | Bagnall | 323—43.5 |
| 2,547,615 | 4/1951 | Bedford | 323—43.5 |
| 2,714,188 | 7/1955 | Scherer | 323—66 |
| 2,758,161 | 8/1956 | Jackson | 323—89 |
| 2,839,719 | 6/1958 | Artzt | 323—45 |
| 3,089,081 | 5/1963 | Brosh | 323—51 |
| 3,140,439 | 7/1964 | Weil | 323—89 |
| 3,174,096 | 3/1965 | Lichowsky | 323—44 X |
| 3,176,212 | 3/1965 | Depuy | 323—22 X |
| 3,263,157 | 7/1966 | Klein | 323—22 |

JOHN F. COUCH, *Primary Examiner.*

LLOYD, McCOLLUM, *Examiner.*

W. E. RAY, W. H. BEHA, *Assistant Examiners.*